United States Patent
Matthews et al.

(10) Patent No.: US 11,420,641 B2
(45) Date of Patent: Aug. 23, 2022

(54) SYSTEM AND METHOD FOR DETERMINING THE ENERGY REQUIREMENT OF A VEHICLE FOR A JOURNEY

(71) Applicant: Spark EV Technology Ltd., Kennett (GB)

(72) Inventors: Gregory James Matthews, Mepal (GB); Justin Bradley Ott, Chrishall (GB)

(73) Assignee: Spark EV Technology, Ltd., Kennett (GB)

( * ) Notice: Subject to any disclaimer, the term of this patent is extended or adjusted under 35 U.S.C. 154(b) by 700 days.

(21) Appl. No.: 16/387,936

(22) Filed: Apr. 18, 2019

(65) Prior Publication Data

US 2019/0241192 A1 Aug. 8, 2019

Related U.S. Application Data

(63) Continuation-in-part of application No. 15/850,040, filed on Dec. 21, 2017, now Pat. No. 11,060,883.

(51) Int. Cl.
*B60W 50/00* (2006.01)
*G06N 5/04* (2006.01)
(Continued)

(52) U.S. Cl.
CPC .......... *B60W 50/0097* (2013.01); *G06N 5/04* (2013.01); *G06N 20/00* (2019.01); *G08G 1/202* (2013.01);
(Continued)

(58) Field of Classification Search
CPC ............ G01C 21/3469; G01C 21/3697; B60L 2260/54; B60L 2260/52; B60L 11/1861; B60L 11/1862
See application file for complete search history.

(56) References Cited

U.S. PATENT DOCUMENTS

| 9,121,722 B1* | 9/2015 | Yu ...................... G01C 21/3469 |
| 2012/0029779 A1* | 2/2012 | Dickinson ............. F16H 61/702 701/69 |

(Continued)

FOREIGN PATENT DOCUMENTS

JP   5599509   7/2014

OTHER PUBLICATIONS

Combined Search and Examination Report Under Sections 17 & 18(3) for Application No. GB1721535.1 dated Jun. 18, 2018.

*Primary Examiner* — Redhwan K Mawari
(74) *Attorney, Agent, or Firm* — Fleit Intellectual Property Law; Jose Gutman

(57) ABSTRACT

A system for determining an energy requirement of a vehicle for a journey. The system may comprise a predictor mechanism to predict, using an energy prediction algorithm, a vehicle energy requirement for the journey. The system comprises an updater mechanism configured to refine the energy prediction algorithm for the vehicle by determining for each of a number of historical journeys undertaken by the vehicle, an error between an actual vehicle energy usage for the historical journey and a predicted energy usage derived using the energy prediction algorithm for the historical journey. An aggregate error is calculated from the errors of the number of historical journeys. The updater is arranged to adjust the energy prediction algorithm to reduce the aggregate error.

12 Claims, 8 Drawing Sheets

(51) Int. Cl.
*G06N 20/00* (2019.01)
*G08G 1/00* (2006.01)
*G08G 1/052* (2006.01)

(52) U.S. Cl.
CPC ............... *B60W 2050/0052* (2013.01); *B60W 2050/0075* (2013.01); *B60W 2050/0088* (2013.01); *B60W 2552/15* (2020.02); *B60W 2554/80* (2020.02); *B60W 2556/00* (2020.02); *B60W 2556/10* (2020.02); *G08G 1/052* (2013.01)

(56) References Cited

U.S. PATENT DOCUMENTS

| | | | | |
|---|---|---|---|---|
| 2012/0083984 A1* | 4/2012 | Johansson | ......... | B60W 50/0097 701/70 |
| 2013/0179062 A1* | 7/2013 | Yasushi | ............ | G06F 17/00 701/123 |
| 2014/0207363 A1* | 7/2014 | Kanno | ............ | B60L 15/2045 701/123 |
| 2014/0278038 A1 | 9/2014 | Stankoulov | | |
| 2014/0324328 A1* | 10/2014 | Granato | ............ | B60W 20/12 701/123 |
| 2015/0134174 A1* | 5/2015 | Preece | ............ | B60L 58/13 701/22 |
| 2015/0241310 A1 | 8/2015 | Brown | | |
| 2016/0123752 A1* | 5/2016 | Kandula | ............ | G01C 21/3469 701/123 |
| 2016/0153796 A1* | 6/2016 | Stankoulov | ....... | B60W 40/1005 701/123 |
| 2017/0030728 A1* | 2/2017 | Baglino | ............ | G01C 21/3469 |
| 2019/0114588 A1* | 4/2019 | Radetzki | ............ | G05D 1/0217 |
| 2019/0195650 A1* | 6/2019 | Matthews | ........... | G01C 21/3446 |
| 2019/0241192 A1* | 8/2019 | Matthews | ............ | G08G 1/202 |
| 2019/0265057 A1* | 8/2019 | Baglino | ............ | G01C 21/3469 |

\* cited by examiner

SYSTEM AND METHOD FOR DETERMINING THE ENERGY REQUIREMENT OF A VEHICLE FOR A JOURNEY

FIELD OF THE INVENTION

The invention relates to a system and method for determining the energy requirement of a vehicle for a journey, the invention is particularly applicable, though does not exclusively relate, to electric vehicles. The system and method may be used as part of a vehicle scheduling system.

BACKGROUND TO THE INVENTION

Existing vehicle range prediction systems function by extrapolating recent consumption data of the vehicle, e.g., over the last 15 minutes, to provide an indication of the remaining range of the vehicle before refueling or recharging. They do not take into account the full nature of the journey to be undertaken by the vehicle and as a consequence the ranges returned are often inaccurate. This is particularly problematic for vehicles which have a long refueling/recharging interval or where refueling/recharging stations are sparse.

The present invention was developed to ameliorate the above problems.

SUMMARY OF THE INVENTION

In a first aspect of the invention there is provided system for determining an energy requirement of a vehicle for a journey, the system adapted to: obtain journey data relating to the journey and obtain vehicle data associated with the vehicle; the system comprising a predictor mechanism to predict, using an energy prediction algorithm, a vehicle energy requirement for the journey from the journey data and vehicle data; the system comprising an updater mechanism configured to adjust the energy prediction algorithm for the vehicle by: determining for each of a number of historical journeys undertaken by the vehicle, an error between an actual vehicle energy usage for the historical journey and a predicted energy usage derived using the energy prediction algorithm for the historical journey from historical journey data and historical vehicle data, each historical journey of the number of historical journeys being associated with a respective error of a set of errors; determining an aggregate error from the set of errors; and adjusting the energy prediction algorithm to reduce the aggregate error.

In a second aspect of the invention there is provided a computer implemented method for determining energy requirement of a vehicle for a journey, the method comprising: obtaining journey data and obtaining vehicle data associated with the vehicle; predicting using a predictor mechanism with an energy prediction algorithm, a vehicle energy requirement for the journey from the journey data and vehicle data; adjusting the energy prediction algorithm for the vehicle by: determining for each of a number of historical journeys undertaken by the vehicle, an error between an actual vehicle energy usage for the historical journey and a predicted energy usage derived using the energy prediction algorithm for the historical journey from historical journey data and historical vehicle data, each historical journey of the of the number of historical journeys being associated with a respective error of a set of errors; determining an aggregate error from the set of errors; and adjusting the energy prediction algorithm to reduce the aggregate error.

According to another aspect of the invention there is provide a dispatch system implemented by one or more computers for selecting a vehicle from a plurality of vehicles to undertake a journey in response to receiving a journey request from a user of the system, the system comprising: a receiver to receive the journey request from the user; means to determine for each of the plurality of vehicles, an energy requirement for the vehicle to undertake the journey subject of the journey request; a vehicle selector that uses the determined energy requirements to select a vehicle from the plurality of vehicles to undertake the journey; and means to send a journey instruction comprising information relating the journey subject of the journey request, to the selected vehicle; and wherein the means to determine for each of the plurality of vehicles, an energy requirement for the vehicle to undertake the journey subject of the journey request, comprises the system for determining an energy requirement of a vehicle for a journey described above.

The selected vehicle may be an autonomous vehicle that comprises a vehicle controller (e.g. implemented by a computer system) that drives the vehicle, and in which in response to the controller receiving the journey instruction, it causes the vehicle to drive away from its present location to undertake the journey.

By adjusting the energy prediction algorithm to minimise the aggregate error for historical journeys, the algorithm more accurately predicts the energy requirement for future journeys undertaken by a specific vehicle and driver combination.

In this application the term 'driver' is taken to include an electronic system used to drive an autonomous vehicle as well as, more conventionally, a human.

The following features apply to all aspects of the invention above.

Where the vehicle's energy store is a chemical energy store, such as for example, a hydrogen cell or gasoline tank, the energy on board data may comprise an indication of the fuel level and/or pressure. Where the energy store includes one or more batteries, capacitor or the like, the energy on board data may include an indication of the state of charge.

The system may be arranged to retrieve vehicle data from the vehicle. Vehicle data may comprise variant vehicle data, that being data expected to change over time, such as on an inter-journey or intra-journey basis, and invariant vehicle data which is expected to remain substantially static. Variant vehicle data may be retrieved repeatedly from the vehicle, e.g. at least every 60 seconds, whilst the vehicle is in operation. This ensures the predictor mechanism can use relatively accurate data of the vehicle's condition to determine a prediction. It also means that the location of the vehicle can be known to a reasonable accuracy so that that the system can determine when the vehicle has finished a journey.

Examples of variant vehicle data include one or more of: location of the vehicle (e.g. provided through a global navigation system), state of health of the energy storage system (e.g. degradation of maximum storage capacity over time), vehicle system temperature(s) (e.g. the temperature of the energy store), and tire pressures. This data may be obtained from the vehicle's computer.

The system may include a vehicle device (e.g. a computing device) arranged to receive the vehicle data from the vehicle (e.g. via one or more sensors) and transmit the received vehicle data, typically wirelessly, for receipt by the predictor mechanism. In one arrangement the vehicle device is connected to a computer of the vehicle, the vehicle's computer being connected to vehicle sensors. In a variant embodiment, the vehicle device comprises the vehicle's computer arranged to directly transmit the vehicle data. Vehicle data may be received by a prediction system that includes the predictor mechanism and updater mechanism.

Invariant vehicle data may include one or more of: vehicle dimensions; kerb weight; drag coefficients of the vehicle's chassis; auxiliary loads (e.g. headlamp consumption, interior heating system consumption) and type of tires fitted. As this information is not expected to change on a per journey basis, it will not typically be obtained directly from the vehicle but rather from other sources such as vehicle specifications published by the manufacturer and user input. Invariant vehicle data may be obtained when the vehicle is added to the system or in the first instance that a vehicle of the same make is added to the system.

The system may be arranged to determine the energy requirement for multiple vehicles in which case the system may obtain vehicle data from each vehicle for which journey predictions are made. The system may be arranged to hold a separate energy prediction algorithm for each vehicle. The system may be arranged to update each energy prediction algorithm based on the historical journeys carried out by the vehicle to which it is associated. As such each energy prediction algorithm will, over time, be tuned to reflect the differences in actual energy usage by its associated vehicle as a consequence of different characteristics, aging and its driver's driving style.

Both variant and invariant vehicle data may be used to predict the vehicle's energy requirement for a journey.

Journey data may comprise geographical information (e.g. geographical coordinates) e.g. of start and end points of the journey, waypoint and/or other routing information. It may also include further information such as one or more of: payload (e.g. number of passengers), route restrictions (e.g., avoid tolls) and speed restrictions imposed on the vehicle (e.g., through the presence of an onboard speed restrictor). Journey data may also include one or more of: local weather (e.g., as applicable to the journey) e.g. wind speed, precipitation, temperature, air pressure, visibility, humidity and cloud cover); topography of the route; route distance; traffic information (e.g., average vehicle speeds at one or more sections along the route; stopping and turning information—e.g. number of stops and turns; road surface—type thereof and/or condition; and sunset/sunrise times. Journey data may be retrieved, at least in part, from one or more third party providers, e.g. metrological organisations and traffic information services. Journey data may be received, at least in part, via the internet.

The system may be arranged to receive a request for a prediction for an energy requirement for a journey from a journey request device, for example, a user via a computer, phone; a satellite navigation system or a vehicle scheduling system. The request may include the journey data.

The system may be adapted to retrieve energy on board data from the vehicle. The energy-on-board data may be used to derive the actual vehicle energy usage for the historical journey.

The actual vehicle energy usage may be derived using energy on board data retrieved from the vehicle at the beginning and end of the historical journey. The system may determine that a journey has ended using geographical information retrieved from the vehicle and/or by the user indicating the journey has ended.

The system may be adapted to use the energy on board data and a prediction of the vehicle energy required for a journey from the predictor mechanism to provide an output indicating if the journey is possible with the current energy on board the vehicle.

The system may be adapted to use the energy on board data and a prediction of the vehicle energy required for a journey from the predictor mechanism to provide an indication of the remaining power on board the vehicle that can be expected at the end of the journey.

The system may be arranged to store in a memory store, as historical data the journey data and/or vehicle data; or data derived from the journey data and/or vehicle data used and/or derived by the predictor mechanism to determine a prediction for a journey. The stored historical data may be used by the updater mechanism to determine a prediction for that journey as a historical journey. The memory store may also hold the energy prediction algorithm used by the predictor mechanism to predict the energy requirement for the journey.

Predicting an energy requirement for a vehicle for a journey may comprise determining multiple factors for the journey, each factor derived from the vehicle data and/or journey data; applying a weighting for each factor; and combining the weighted factors to derive the overall energy requirement.

The factors may include one or more of: journey distance, height of ascent, height of descent, one or more speeds along the route of the journey; expected frequency of stops/starts; payload; location of re-fuelling station; auxiliary loads; drag and impact of energy recovery system.

The journey distance factor may, for example, be derived from journey data, e.g. start and end point locations, and mapping data. An auxiliary load factor, for example, may be derived using invariant vehicle data, e.g. wattage of headlamps and heater and journey data, e.g. outside temperature, visibility and sunset/sunrise time.

The above factors relate to concrete attributes associated with calculation of kinetic energy, potential energy, drag energy etc. Alternatively or in addition, abstract factors each derived from a different combination of one or more of the vehicle data and journey data but having no direct relation to real world measurements of energy, may be used instead.

The system may learn the specific individual contributions of each factor to the overall energy consumption for the vehicle and driver for a journey to make better predictions.

In an implementation of this, the system may be arranged to update the energy prediction algorithm by adjusting the weightings for the factors to minimise the aggregate error.

The predictor mechanism may be adapted to include a safety margin within the predicted vehicle energy requirement for the journey, and the updater acts to adjust the size of the safety margin according to the sizes of the individual errors of the historical journeys. Updating the prediction algorithm to minimise the aggregate error allows the safety margin to be reduced.

For each historical journey the updater may be arranged to derive a predicted energy usage using the energy prediction algorithm by: retrieving and/or determining values for multiple factors for the historical journey, the factors being derived from one or more of: journey data associated with the historical journey and vehicle data associated with the historical journey applying a weighting to each factor; and combining the weighted factors; and in which the updater is further arranged to apply an adjustment to a weighting for one of the factors to reduce the aggregate error, the adjustment being applied to the corresponding factor for each of the historical journeys.

The system may include a prediction system that includes the functions of the predictor mechanism and updater mechanism. The prediction mechanism may be connected to a network to receive the vehicle information, journey information and journey requests via the network.

The method may comprise predicting a vehicle energy requirement for the journey comprising: determining multiple factors for the journey, each factor derived from the journey data and/or vehicle data; applying a weighting to each factor; and applying the weighted factors in the energy prediction algorithm to derive the predicted vehicle energy requirement for the journey.

The method may comprise deriving a predicted energy usage using the energy prediction algorithm for each historical journey by:
retrieving and/or determining values for multiple factors for the historical journey, the factors being derived from the: journey data associated with the historical journey and/or vehicle data associated with the historical journey associated with the historical journey; applying a weighting to each factor; and applying the weighted factors in the energy prediction algorithm to derive the predicted vehicle energy requirement for the historical journey; and in which an adjustment is applied to a weighting for one of the factors to reduce the aggregate error, the adjustment being applied to the corresponding factor for each of the historical journeys.

The functions of the predictor mechanism and updater mechanism may be implemented by suitably programmed circuitry including one or more processors and computer readable memory using techniques known to those skilled the art.

In another aspect, the method may be embedded in a computer program product embodied in one or more non-transitory computer readable medium(s), which comprise all the features enabling the implementation of the methods.

BRIEF DESCRIPTION OF THE DRAWINGS

Various embodiments of the invention will now be described by way of example with reference to the drawings, as follows.

DETAILED DESCRIPTION

As required, detailed embodiments are disclosed herein, however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected", although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

Figure 1:
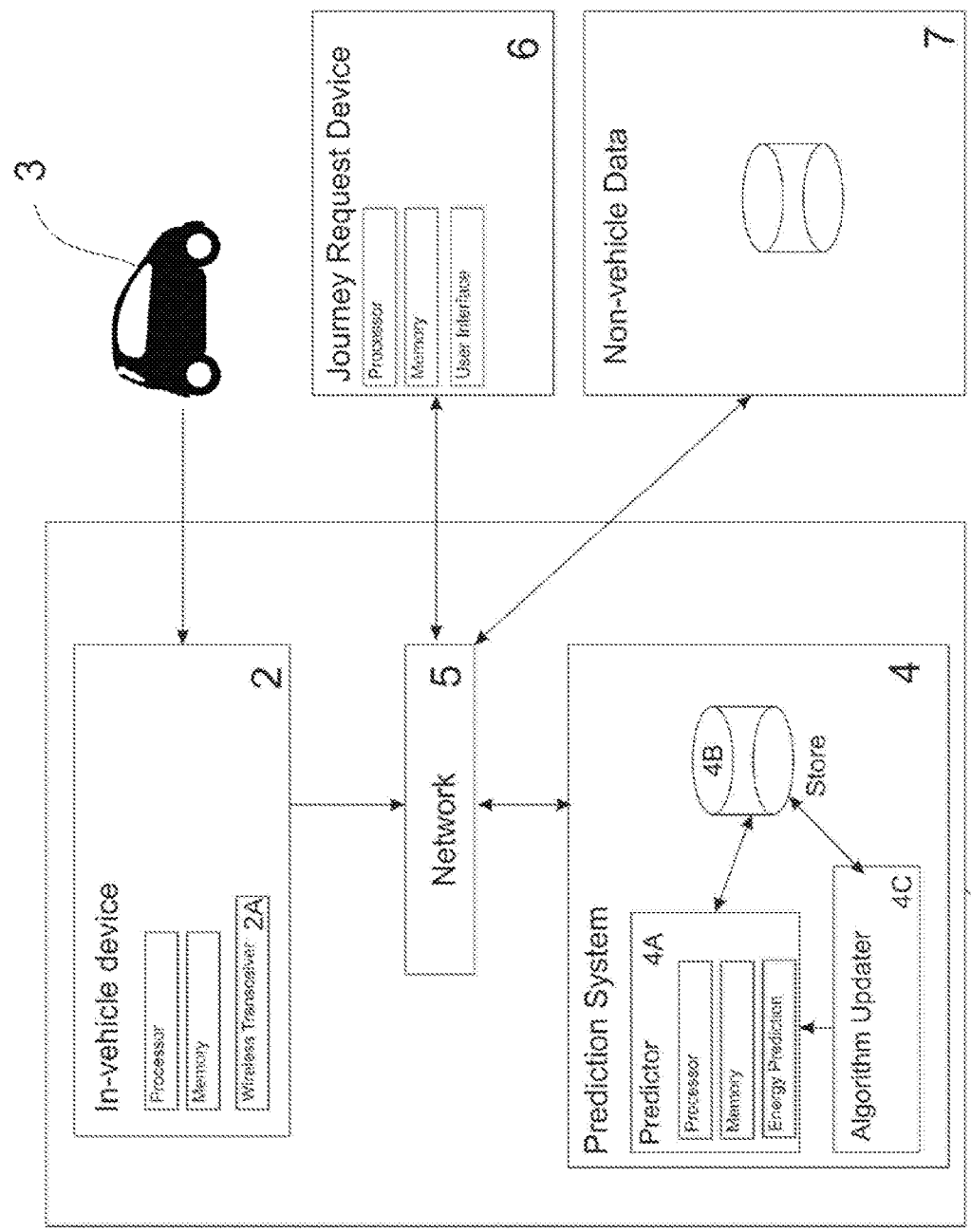
FIG. 1 is a schematic of a system for determining an energy requirement of a vehicle for a journey.

With reference to FIG. 1 there is shown a system 1 for determining an energy requirement of a vehicle for a journey. The system 1 comprises a vehicle device 2 that is located in a vehicle 3, and a prediction system 4.

The prediction system 4 comprises a predictor mechanism 4A, memory store 4B and updater mechanism 4C. A memory store may include any one or more of the following: volatile memory, non-volatile memory, computer storage system, and the like. The prediction system 4 is implemented by one or more suitably programmed processors communicatively coupled with memory stores and other computer components, using techniques known to those skilled in the art. A typical combination of hardware and software used to implement the prediction system 4 could be a general purpose computer system with a computer program that, when being loaded and executed, controls the computer system such that it carries out the methods described herein.

The vehicle device 2, which comprises one or more processors communicatively coupled with memory stores and other computer components, is arranged to receive energy on board data together with other current vehicle data including geolocation data from the vehicle 3, and to relay the current vehicle data via a wireless transmitter 2A (which could be a wireless transceiver) via a network 5 that includes a wireless receiver (not shown), to the prediction system 4.

In one arrangement the vehicle device 2 is arranged to be connected to an onboard computer of the vehicle and receive said vehicle data from the computer; however, in another arrangement the computer may itself be arranged to transmit the vehicle information and thus the vehicle device may be omitted. The functions of the device may be carried out by a mobile(cellular) phone running a suitable application; where this is so, and the mobile phone is onboard the vehicle, geolocation information of the vehicle may be derived from the mobile phone's own global navigational chip.

The system 1 is adapted to receive a request for a journey prediction from a journey request device 6, e.g. from a user (who may be in the vehicle) via a computer, satellite navigational system or a vehicle journey scheduling system such as might be used by a taxi or courier company. The request identifies the vehicle and driver combination that will carry out the journey for which the prediction is requested and includes journey information identifying the destination and any waypoints. Favourably the journey information also includes further information such as payload (e.g. number of passengers), route restrictions (e.g. avoid tolls) and speed restrictions imposed on the vehicle.

The journey prediction request is received by the prediction system 4 via the network 5. In response the predictor 4A, implementing an energy usage algorithm stored in memory store 4B, derives an energy requirement prediction using the received current variant vehicle data from the vehicle device 2, together with invariant vehicle data pertaining to the vehicle from memory store 4B and journey data pertaining to the journey from external source 7 (e.g. one or more third party data providers) through network 5. A safety margin is applied to the calculated prediction to account for expected error in the predicted energy usage for the journey compared with the actual energy usage for the journey. The derived prediction (including safety margin) is returned via network 5 to the journey request device 6.

Where the predicted energy requirement (including safety margin) exceeds that of the energy on board the vehicle 3 as provided from vehicle device 2 (e.g., where an electric car energy on board data may be derived from state of charge data and battery health data), the predictor 4A returns an indication to the journey request device 6 that the journey is not achievable with the energy on board.

Where the request is submitted by a user it may be submitted via a computer, including portable computer such as smart phone. The request may be received from a satellite navigational system and used by the satellite navigation system to determine an appropriate route for a trip e.g. a route that is most suitable given the vehicle's state of charge.

Where the system is used in conjunction with a scheduling system 6, the scheduling system may use the system 1 to provide predictions for a set of vehicles available to carry out a journey that includes travel between at least two locations (e.g. as a request of a request for a taxi by a customer). The predictions may be used by a scheduling system to determine which vehicle of the set of vehicles would be most suitable to carry out the journey given the vehicles' different locations and states of charge.

The prediction together with the data used to create the prediction is stored in memory store 4B.

This process repeats each time a journey prediction request is made for the vehicle driver combination.

Following completion of a journey, the system determines the actual energy usage for the journey using the energy on board data from the vehicle device 2 at the start and end of the journey. The system 1 may determine that the vehicle has completed the journey though, e.g. an indicator from the user/scheduling system, and/or geolocation information received from the vehicle device 2.

Figure 2:
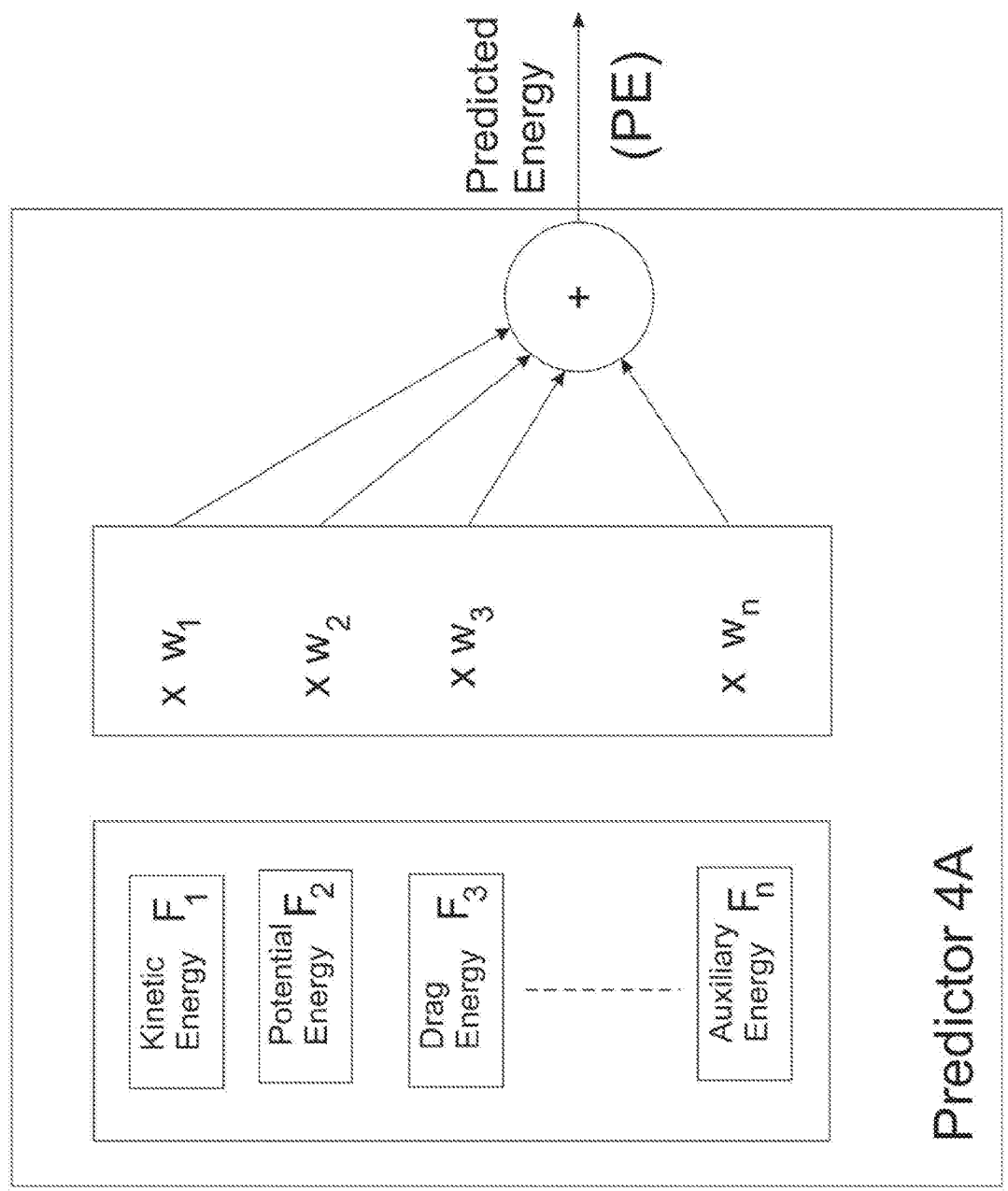
FIG. 2 is a schematic of the process for deriving an energy requirement prediction for a journey.

With reference to FIG. 2, to derive an energy usage prediction for a journey, the predictor 4A uses the vehicle data and journey data to determine predicted values for individual energy component factors $F_1$-$F_n$ that summed together (or otherwise combined) provide the predicted energy usage for the journey. A weighting $W_1$-$W_n$ is associated with each factor. The associated weighting is applied (e.g. multiplied) to each individual energy component factor F, e.g. $F_1 \cdot W_1$, $F_2 \cdot W_2$ ... $F_n \cdot W_n$ and the weighted factors summed:

$$PE = \sum_1^n Wn \cdot Fn$$

to provide a weighted predicted energy usage prediction (PE). For a new vehicle driver combination the weightings may be initially set so as to have neutral affect, i.e. such that the weighted prediction is the same as a non-weighted prediction. Alternatively, the weighting may be selected to reflect that of another similar vehicle for which historical journey information has already been recorded.

The system may determine the journey as including a route from a destination provided by the user/scheduling system to a proximate refueling station. The system may also determine the journey to include a route from the vehicle's current location to a starting location as provided by the user/scheduling system.

Periodically or at some non-regular time interval, the prediction system 4 runs the algorithm updater 4C to refine the algorithm.

Figure 3:
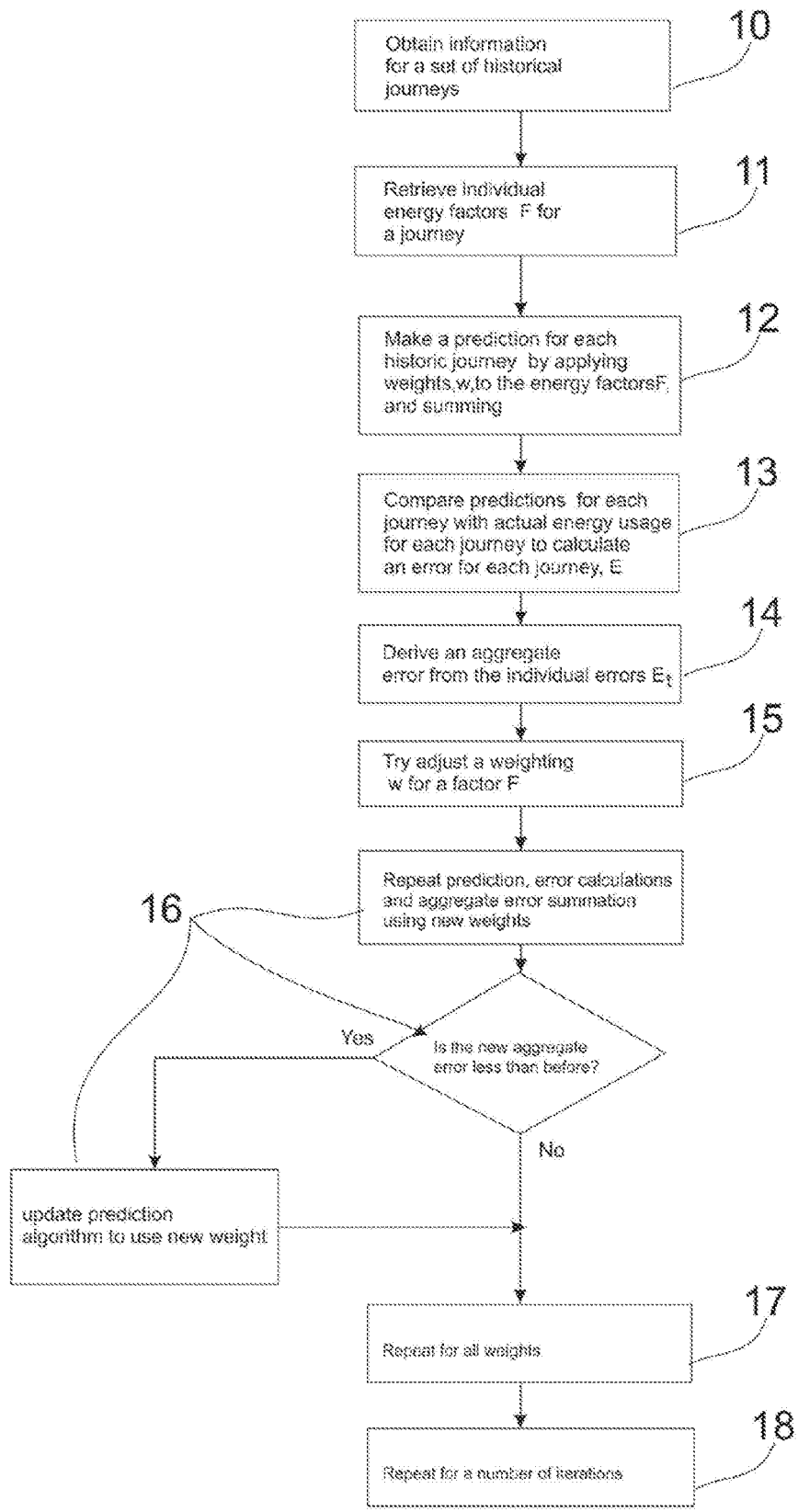
FIG. 3 is a flow chart of the process for updating the algorithm used to derive the energy requirement prediction for the journey.

With reference to FIG. 3, the updater 4C obtains information for a set of historical journeys held in memory store 4B (10), for each historical journey the updater retrieves (or derives) the values for the individual energy component factors F (11), applies a weighting W to each factor F and sums the weighted factors to derive a predicted energy usage for the historical journey (12). The predicted energy is compared with an actual energy used for the journey as held in memory store 4B to determine an error E for the journey (13). This leads to a set of errors $E_1$-$E_j$ where j is the number of journeys in the historical set. The errors $E_1$-$E_j$ are combined (e.g., summed) to provide an aggregate error $E_t$ (14).

The updater then adjusts a weighting W for a factor F (15), the same adjustment is made to the same factor of each of the historical journeys leading to a new set of errors $E_1$-$E_j$. If the adjustment results in a reduced aggregate error $E_t$, the algorithm stored in memory store 4B is updated with the new weighting W (16). This process is iterated for the weighting for each factor, e.g., $W_1$, then $W_2$ ... to $W_n$(17).

This process is repeated until either the aggregate error $E_t$ is within a desired tolerance or to a desired number of iterations (18). The refined algorithm is stored in memory store 4B. It will be appreciated that the order that the factor weightings are altered does not have to be specific.

In updating the weighting W for a factor F, the updater may anchor the value of the weighting W such that it becomes progressively more difficult for the weighting value to move away from its anchoring value as the difference between the weighting value and anchoring value increases.

Anchoring is advantageous for providing prediction estimation for journeys which have characteristics that differ markedly from that the vehicle usually undertakes. For example, a vehicle that rarely encounters elevation changes may in the absence of anchoring have a weighting W for elevation that drift to an implausible value such that when the vehicle does undertake a journey that includes significant elevation change the energy prediction would be significantly in error.

By varying the weighting, the algorithm is refined to account for idiosyncrasies of the particular vehicle and driver combination that affect energy consumption, e.g., the driver's driving style and changes in the vehicle's condition and as such becomes more accurate at predicting the energy requirement for future journeys.

It will be appreciated to those skilled in the art that in addition to the gradient descent approach described above, there are numerous other possible methods of optimising the algorithm to lower aggregate error $E_t$, including for example, solving a set of simultaneous equations. It will be appreciated that the exact method used is not necessarily of import.

As part of the refinement process, the updater 4C determines the safety margin that is applied to the calculated prediction PE. The size of safety margin is related to the sizes of one or more of the individual errors $E_1$-$E_j$, for the historical journeys derived from the refined algorithm. As the individual sizes of the errors $E_1$-$E_j$ reduces, the size of the safety margin used will also reduce. The size of the safety margin may be derived using standard deviation of the individual errors, by size of the largest individual error or by some other means.

In a variant embodiment, the system as a whole may be located in the vehicle making the journey and may, for example, form a part of the vehicle's satellite navigation system with the functions of the prediction system carried out by the vehicle's computer. In such an arrangement the vehicle device may be omitted. Requests for journey information may be provided by a user via an interface of the vehicle's satellite navigation system.

The system may be adapted to determine an energy requirement for a journey without live vehicle data. In this variant arrangement, the system may use the most recent vehicle data it has for the vehicle and/or values provided by a user or scheduling system.

Figure 4:
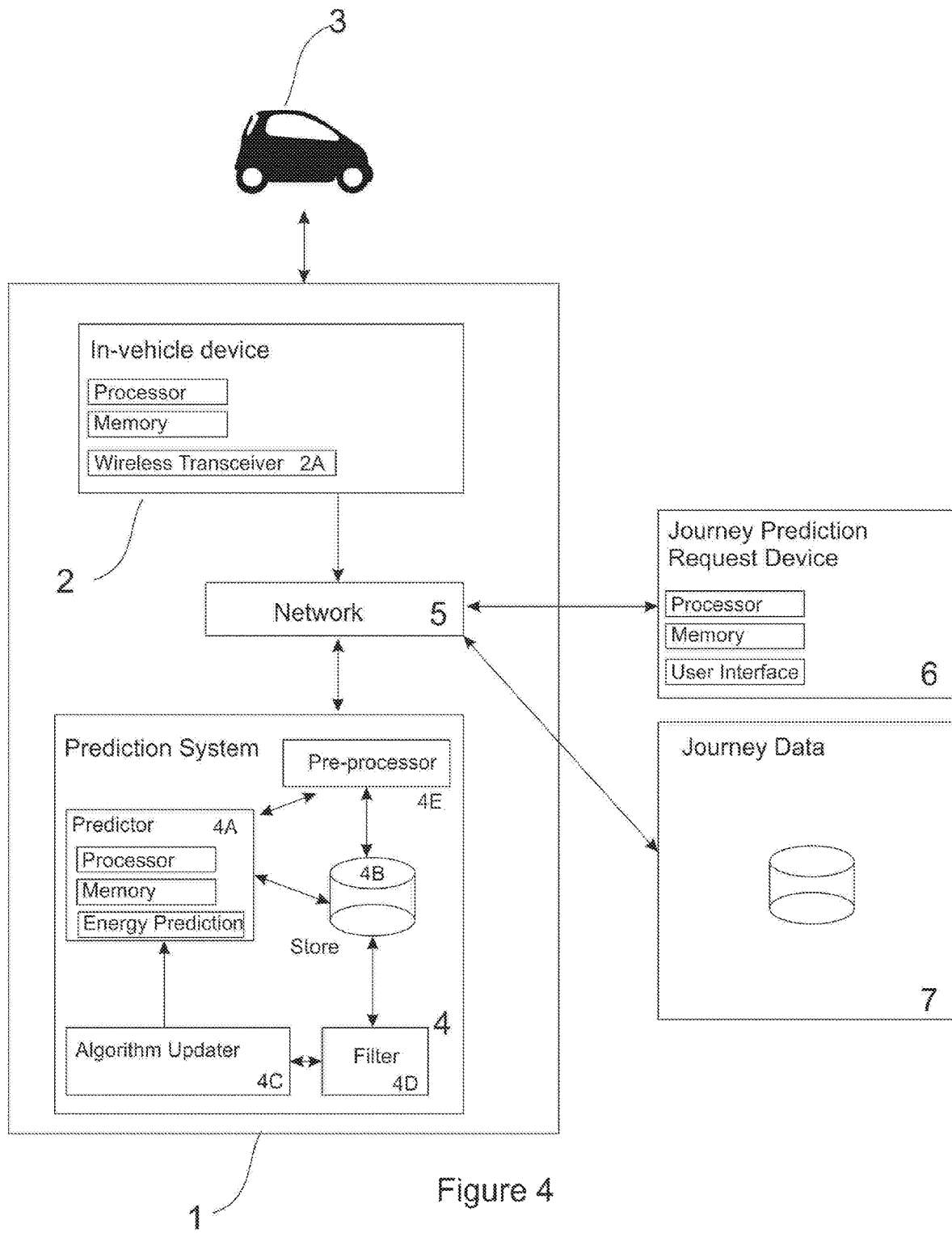
FIG. 4 is a schematic of a variant system for determining an energy requirement of a vehicle for a journey.

FIG. 4 illustrates a schematic of a variant system for determining an energy requirement of a vehicle for a journey that includes the features of a filter 4D and preprocessor 4E. The functions of the filter and pre-processor are described with reference to FIGS. 5, 6 and 7 below.

The ability of the updater to refine the algorithm as described above with reference to FIG. 3 is dependent in part on the quality of the information of the historical journeys used in the refinement process. In particular there will be occasions where the quality of the journey data used to make a historical prediction for a historical journey was of poor quality rendering the historical prediction inaccurate in a way that its inclusion within the set of historical journeys (10) would impair refinement of the algorithm. To reduce the likelihood of poor quality data being used, the prediction system may include a filter 4D used to filter historical journey information that is used by the updater to refine the algorithm.

Figure 5:
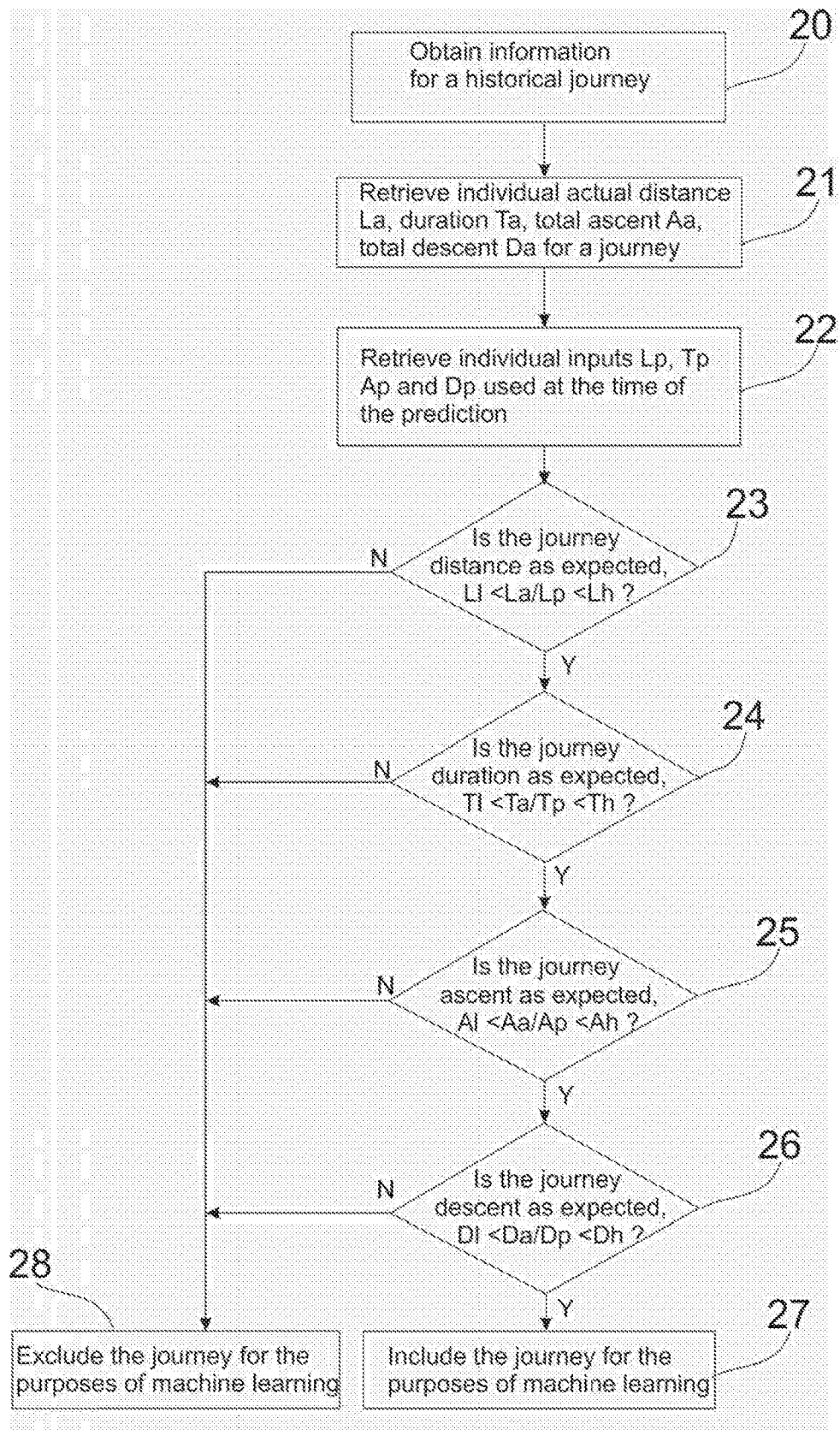
FIG. 5 is a flow chart of a process used to filter historical journeys used to update the algorithm.

The process flow of the filter 4D is illustrated in FIG. 5. Historical journey data for a set of historical journeys is retrieved (20) from store 4B the historical journey data retrieved includes actual values of certain characteristics of the journey such as for example one or more of: the actual distance of the journey, duration, total ascent made during the journey and total descent made during the journey (21); together with the predicted values for these characteristics that were used to make the historical prediction (21). The actual values will typically have been obtained from the in-vehicle device 2; the values used for the prediction having been obtained from the external source. The filter compares (22, 23, 24, 25) each actual value with the predicted value to determine a divergence.

Where the actual value and predicted value have a divergence that is within a threshold range (which may differ for each characteristic), the quality of the journey data used to make the prediction is treated as sufficient and the prediction for that journey is included within the set of the historical journeys used to refine the algorithm (26). Where the actual value and predicted value diverge by greater than the threshold range, the journey data used to make the prediction is considered to have been of a poor quality and the prediction for that historic journey is excluded (27) from the set of the historical journeys used by the updater to refine the algorithm.

Figure 6:
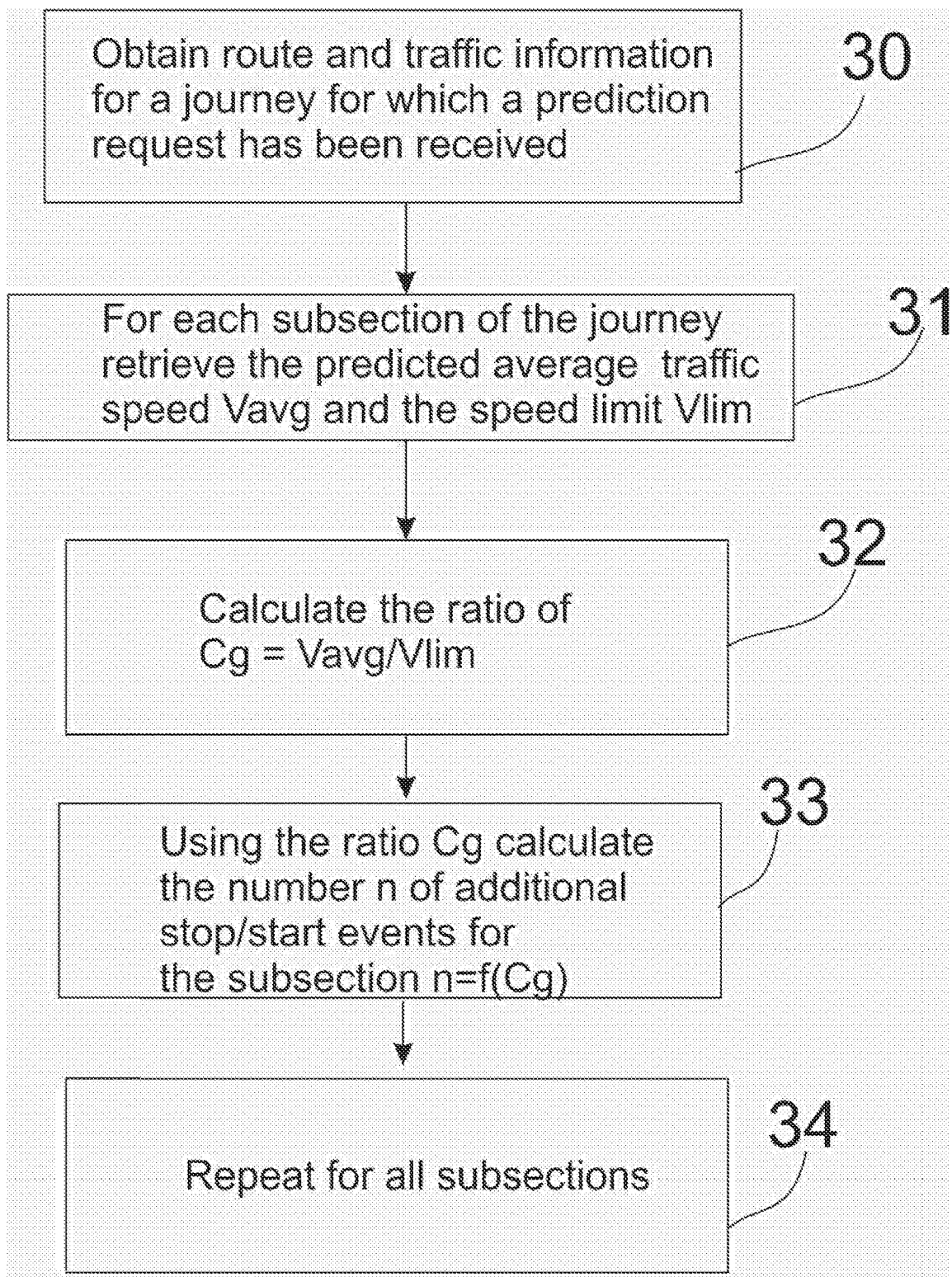
FIG. 6 is a flow chart of a process used to improve the estimate of the number of stop and starts in a journey by identifying a degree of congestion about the journey.

The prediction system may further include a pre-processing mechanism 4E to process journey data that is used for making energy predictions for journeys and for refining the algorithm in order to improve the quality of the journey data used for these purposes and thus, as a corollary, the predictions and refinement. Two examples of processes used by the pre-processing mechanism to refine the journey data are illustrated in FIGS. 6 and 7 respectively.

The typical method of predicting the number of stops and starts of a vehicle on a journey is to determine from the journey data the number of junctions the journey includes and to include a stop and start for each. This leads to determinations for the number of stop and start which are often inaccurate especially for journeys through urban routes. The prediction for the number of stop-start events for a journey using journey data is improved by the process illustrated in FIG. 6.

Route information for the journey for which an energy prediction has been requested is obtained (30), the route is divided into subsections and for each subsection journey data comprising the speed limit for that subjection and the predicted average traffic speed are obtained (31), both of these values are typically obtained from an external traffic data source. The ratio of the average traffic speed and speed limit is calculated (32) which provides an indication of how congested the road will be. The ratio is used to calculate a predicted number of additional stop-start events for the subsection (33). This process is repeated for each subjection of the journey (34) in order to predict a total number of additional stop-start events for the journey. The predicted number of stop-start events forms an input to the predictor 4A.

Figure 7:
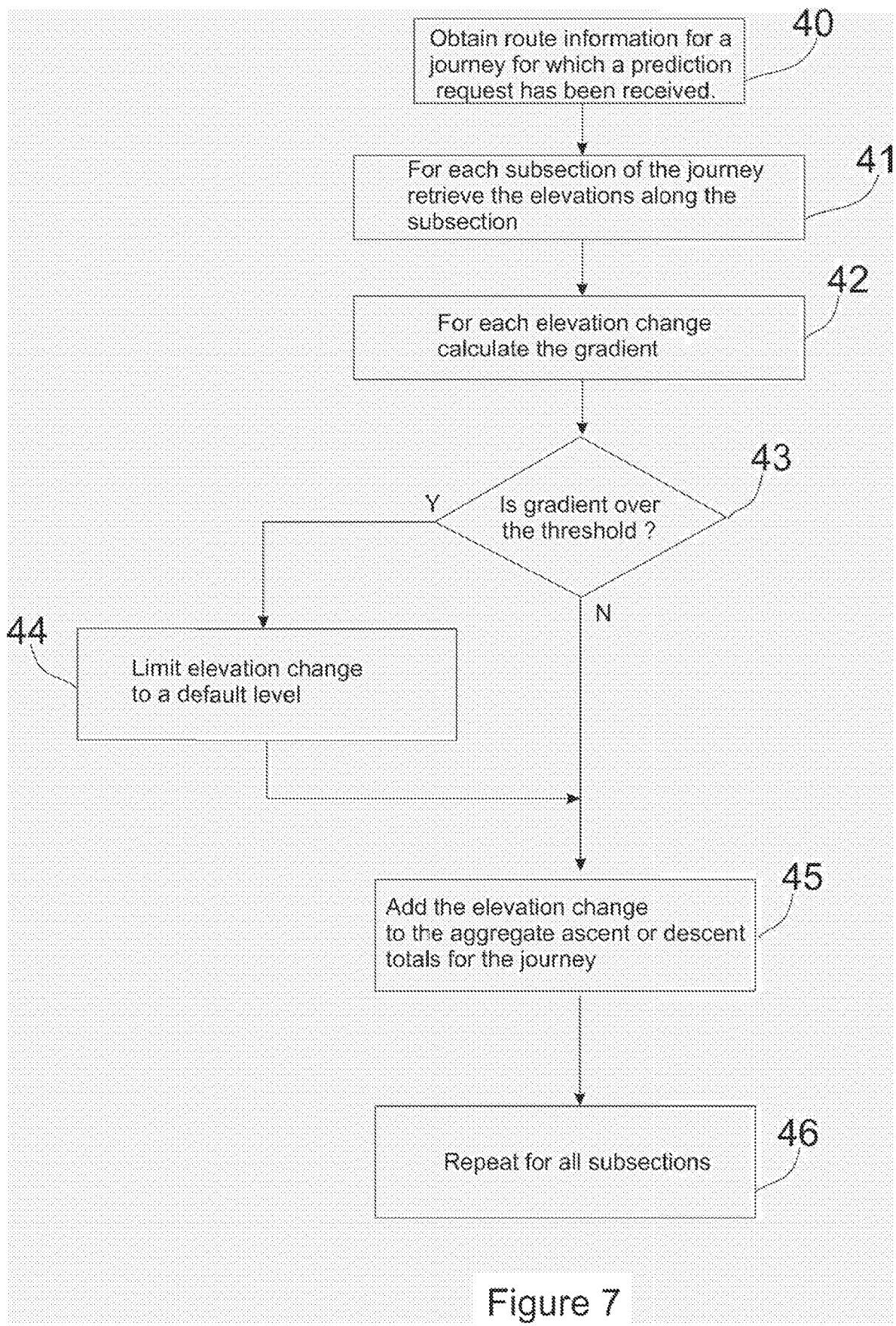
FIG. 7 is a flow chart of a process used to improve the accuracy of road elevation data.

The process shown in FIG. 7 is used to alter journey data that represents the topography of a region, in order to provide more accurate values for the predicted ascent and descent of a vehicle for a journey. The topographical information of a route will typically provide fairly accurate indication of the gradient and changes in elevation of the road; however, marked divergences may occur where the road traverses the region by way of a tunnel through a mountain, or a bridge spanning a gorge or the like. In such cases the gradient of the road is likely to be relatively flat compared with that expected from the topography data.

The process illustrated in FIG. 7 comprises obtaining route information for the journey (40) for which a journey prediction request has been made. The route is divided into subsections and for each subsection journey information relating to the topography of the subsection is identified (41) the topography information is used to determine one or more elevation changes within the subsection. For each elevation change a gradient is calculated (42), the calculated gradients are compared to a threshold gradient value (43), which may, for example, be set as the known maximum gradient for a road in the region, country, etc., or otherwise choose a limit of an expected plausible gradient. If the calculated gradient is above the threshold, the calculated gradient is ignored (44) and a default elevation change (e.g. zero) is added to the aggregated ascent or descent totals for the journey (45). If the calculated gradient is below the threshold the elevation change associated with the gradient is added to the aggregated ascent or descent totals for the journey (45). This process is repeated for all subsections of the journey (46).

Figure 8:
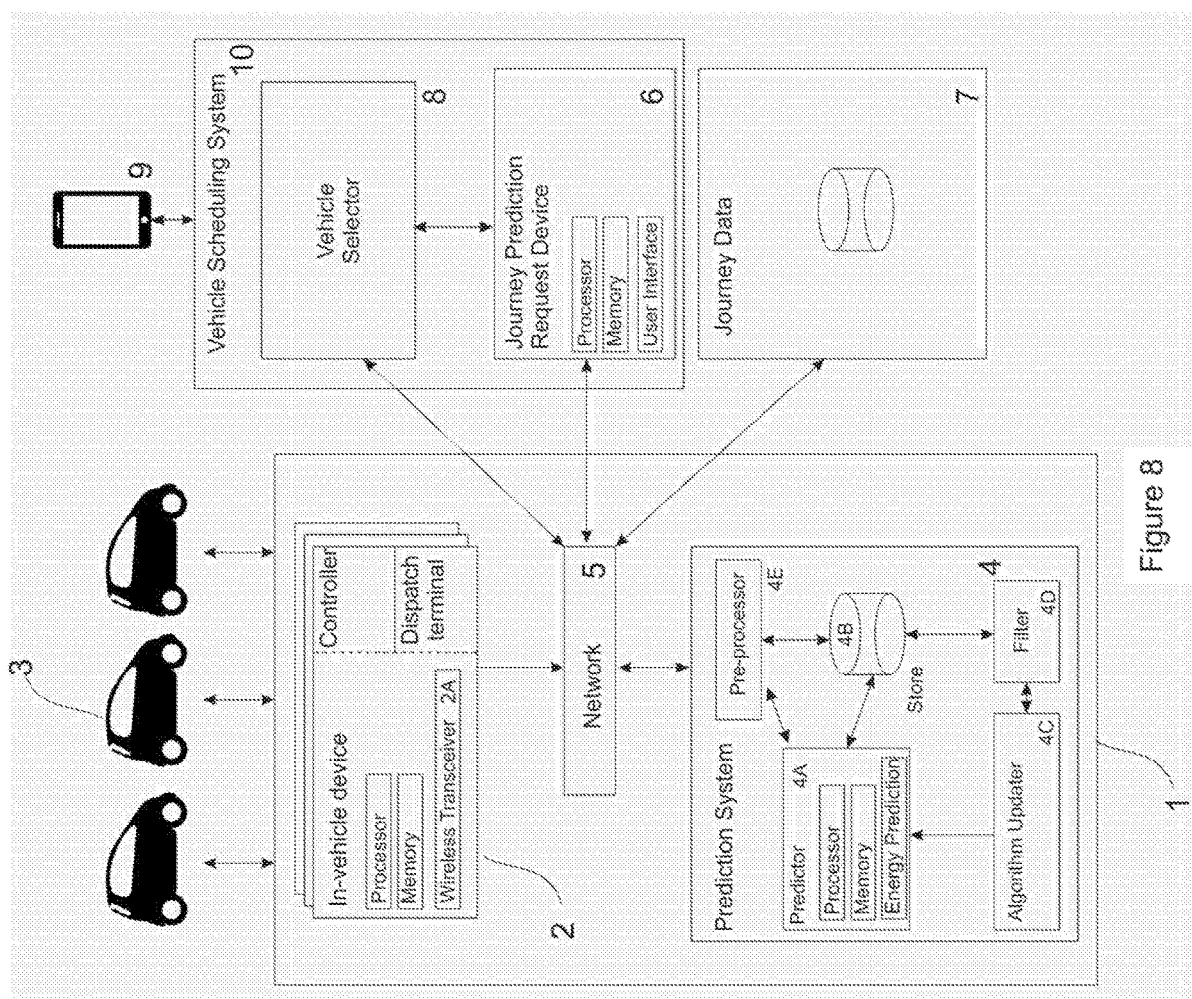
FIG. 8 is a schematic of a vehicle scheduling system that uses the system of FIG. 4 for determining an energy requirement of a vehicle for a journey in order to select a vehicle from a fleet of vehicles to undertake a journey.

FIG. 8 illustrates the system of FIG. 4 (though it could instead be of FIG. 1, i.e. without pre-processor or filter) used in conjunction with a vehicle scheduling system 10 (implemented by a computer system) which in response to receiving a journey request from a user 9 (e.g. through a software application run an electronic device that communicates to the vehicle scheduling system via the internet), obtains energy predictions for the requested journey for a plurality of vehicles 3. The scheduling system 10 includes a receiver (not shown) for receiving the journey request from the user 9 and vehicle selector 8 that uses the energy predictions from the each of the plurality of vehicles to select a vehicle from the plurality of vehicles to undertake the journey.

The vehicle scheduling system 10 sends a journey invitation or instruction to the selected vehicle, e.g. via network 5 (though it could be sent directly). The instruction may include route information (and/or other journey information). The invitation or instruction is received by a dispatch terminal. The dispatch terminal may in response display the invitation/instruction to a driver of the vehicle (if a non-autonomous vehicle) for the driver to accept or refuse (if an invitation). The dispatch terminal may also display the details of the journey. If the vehicle is autonomous, the instruction is passed to a vehicle controller (or it may receive the instruction directly) which in response acts to automatically drive the vehicle to the starting point of the journey and undertake the journey.

In FIG. 8, the dispatch terminal and vehicle controller are shown as part of the in-vehicle device 2. In a variant one or both may be separate to the in-vehicle device and each other. It is not necessary that the vehicle include both the dispatch terminal and controller.

The prediction system 4, vehicle device 2 and journey request device 6 discussed above with reference to FIGS. 1, 4 and 8 can each include various components. Some of these components that are usable by certain example implementations of the computer system will be discussed below.

The prediction system 4 may comprise at least one processor/controller communicatively coupled with persistent (non-volatile) memory 4B of the prediction system 4. A bus architecture communicatively couples the processor/controller of the prediction system 4 with the memory 4B and other components of the prediction system 4. The bus architecture facilitates communication between the various system components in the prediction system 4.

The processor/controller of the prediction system 4 is communicatively coupled with one or more network interface devices of the prediction system 4. For example, and not for limitation, a network interface device can include at least one wireless communication transceiver device (e.g., at least one wireless communication access point transceiver device). The one or more network interface devices of the prediction system 4 are communicatively coupled with one or more communication networks 5 in order to communicate with one or more of the journey request device, vehicle device and external source e.g. for third party data. The network interface device can communicate with one or more communication networks such as a local area network (LAN), a general wide area network (WAN), and/or a public network (e.g., the Internet).

The journey request device 6 may comprise at least one processor/controller of its own of its own communicatively coupled with a memory, which can include main memory and persistent (non-volatile) memory. A bus architecture communicatively couples the processor/controller with the memory and other components of the journey request device 6. The bus architecture facilitates communication between the various system components in the journey request device 6.

The processor/controller of the journey request device 6 is communicatively coupled with at least one user interface of the electronic device. The user interface comprises a user input interface and a user output interface. Examples of elements of the user input interface can include a keyboard a keypad, a mouse, a track pad, a touchpad, a touch screen, and a microphone that receives audio signals. The received audio signals, for example, can be converted to electronic digital representations of the audio signals and stored in memory, and optionally can be used with voice recognition software executed by the processor/controller to receive user input data and commands. Examples of elements of the user output interface can include a display, a speaker, one or more indicator lights, one or more transducers that generate audible indicators, and a haptic signal generator. Some examples of displays are a liquid crystal display (LCD), a plasma display, an organic light emitting diode (OLED) display, and others. A touch screen display (also referred to as a touch input screen) functions both as an output interface device and as an input interface device that can receive direct user input taking the form of "touches," "swipes," or "taps."

The processor/controller of the journey request device 6 is communicatively coupled with one or more network interface devices. For example, and not for limitation, a network interface device can include at least one wireless communication transceiver device (e.g., at least one wireless communication access point transceiver device). The one or more network interface devices are communicatively coupled with one or more communication networks 5. The network interface device can communicate with one or more communication networks 5 such as a local area network (LAN), a general wide area network (WAN), and/or a public network (e.g., the Internet).

The processor/controller of the journey request device may in one arrangement be communicatively coupled with a GPS receiver. That is, GPS data received by the GPS receiver can be used by the processor/controller of the journey request device 6 to determine a geolocation for the journey request device 6. The geolocation of the journey request device 6 may be taken as the geolocation of the vehicle.

The vehicle device 2 may comprise at least one processor/controller communicatively coupled with a memory of the vehicle device 2, which can include main memory and persistent (non-volatile) memory. A bus architecture of the vehicle device 2 communicatively couples the vehicle device's 2 processor/controller with the vehicle device's 2 memory and other components of the vehicle device 2. The bus architecture facilitates communication between the various system components in the vehicle device 2.

The processor/controller of the vehicle device 2 is communicatively coupled with one or more network interface devices of the vehicle device 2. For example, and not for limitation, a network interface device can include at least one wireless communication transceiver device (e.g., at least one wireless communication access point transceiver device). The one or more network interface devices of vehicle device 2 are communicatively coupled with one or more communication networks 5. The network interface device of vehicle device can communicate with one or more communication networks 5 such as a local area network (LAN), a general wide area network (WAN), and/or a public network (e.g., the Internet).

The processor/controller of vehicle device 2 may be communicatively coupled with a GPS receiver of the vehicle device 2. That is, GPS data received by the GPS receiver of the vehicle device 2 can be used by the processor/controller of the vehicle device 2 to determine a geolocation for the vehicle device 2 and thus the vehicle 3.

The processor/controller of the vehicle device 2 may be communicatively coupled with one or more sensor devices (or sensors) of the vehicle 3 either directly or via a computer of the vehicle. Sensors can include various types of sensor devices that provide sensor data to the processor/controller of the vehicle device 2. Examples include one or more of tire pressures, energy of board sensors, e.g. a fuel level sensor or state of charge sensor, vehicle system temperature sensors, sensors to detect the operational state of auxiliary electrical devices, e.g. internal heater of vehicle and headlamps.

One or more of the predictor system, vehicle device and journey request device may include a power supply system that provides power for its operation.

The processor/controller of the journey request device 6, and processor/controller of the vehicle device 2 may communicate with the processor/controller of the prediction system 4 via the communication network 5.

In an alternative arrangement the functions of the predictor mechanism, updater, vehicle device and journey request device may be implemented by a single computer system located in the vehicle. In this arrangement the computer system may have a processor/controller coupled with persistent (non-volatile) memory, a bus architecture communicatively coupling the processor/controller with the memory and other components of the computer system, such as sensors devices, GPS receiver and user interface devices.

As will be appreciated by one of ordinary skill in the art, a system, a method, or a computer program product, may implement various embodiments of the claimed invention. Accordingly, aspects of the claimed invention may take the form of an entirely hardware embodiment, an entirely software embodiment (including firmware, resident software, micro-code, etc.) or an embodiment combining software and hardware aspects. Furthermore, aspects of the claimed invention may take the form of a computer program product embodied in one or more non-transitory computer readable medium(s) having computer readable program code embodied thereon.

Although specific embodiments of the subject matter have been disclosed, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

The invention claimed is:

1. A system for determining a prediction of an energy requirement of a vehicle for an expected vehicle journey, the system carried by the vehicle, and the system comprising:
   one or more vehicle sensors carried by the vehicle, the vehicle sensors coupled with the vehicle and sensing physical states and conditions of the vehicle or a component of the vehicle, and the vehicle sensors providing sensor data in response to the sensing by the vehicle sensors;
   one or more processors communicatively coupled with the one or more vehicle sensors;
   one or more memory stores, and
   one or more network interface devices which are communicatively coupled with one or more communication networks,
   the one or more processors being configured to:
      receive a request, from a journey request device, for a prediction of an energy requirement of a vehicle for an expected vehicle journey, the request including journey data relating to the expected vehicle journey;
      obtain vehicle data associated with the vehicle including the sensor data from the one or more vehicle sensors; and
      obtain, via the one or more network interface devices, non-vehicle data at least in part provided through the one or more communication networks and from one or more remote external information sources;
   the system comprising a predictor mechanism configured to predict, using an energy prediction algorithm, a vehicle energy requirement for the expected vehicle journey from the journey data, the vehicle data, and the non-vehicle data;
   the system comprising an updater mechanism configured to adjust the energy prediction algorithm for the vehicle by:
      determining for each of a number of historical journeys undertaken by the vehicle, an error between an actual vehicle energy usage for the historical journey and a predicted energy usage derived using the energy prediction algorithm for the historical journey from historical journey data, historical vehicle data, and historical non-vehicle data, each historical journey of the number of historical journeys being associated with a respective error of a set of errors;
      determining an aggregate error from the set of errors; and
      adjusting the energy prediction algorithm by an adjustment based on determination of a reduction of the aggregate error by applying the adjustment to the energy prediction algorithm used to derive a predicted energy usage for each of the historical journeys associated with a respective error of the set of errors; and
   wherein for each historical journey the updater is arranged to derive a predicted energy usage using the energy prediction algorithm by:
      retrieving and/or determining values for multiple factors for the historical journey, the factors being derived from one or more of:
         journey data associated with the historical journey, vehicle data associated with the historical journey, and non-vehicle data associated with the historical journey;

applying a weighting to each factor;
applying the weighted factors in the energy prediction algorithm to derive the predicted vehicle energy requirement for the historical journey;
in which the updater is further arranged to apply an adjustment to a weighting for one of the factors based on determination of a reduction of the aggregate error by applying the adjustment, the adjustment being applied to the corresponding factor for each of the historical journeys; and
the predictor mechanism predicting, using the adjusted energy prediction algorithm, a prediction comprising a vehicle energy requirement for the expected vehicle journey, and the predictor mechanism returning the prediction, based on the predicted vehicle energy requirement, to a network interface device of the journey request device; and wherein
the one or more processors being configured to perform one or more of the following:
1) compare actual journey data for a historical journey derived from the vehicle that undertook the historical journey with predicted journey data used to create a historical prediction for the journey, and based on the comparison indicating that the actual journey data and the predicted journey data diverge by greater than a threshold range, excluding the prediction for that historical journey from the number of historical journeys used by the updater mechanism to adjust the energy prediction algorithm for the vehicle journey;
2) compare, for a subsection of a route of the expected vehicle journey, predicted average traffic speed data for the subsection with speed limit data for the subsection, and use the comparison to estimate a number of stop/start events for that subsection, which such number of stop/start events for that subsection is used by the predictor mechanism to predict a vehicle energy requirement for the expected vehicle journey; or
3) compare, for a subsection of a route of the expected vehicle journey, a calculated gradient of a road in the subsection using an elevation change within the subsection obtained or derived from topographical journey data for that subsection, with a threshold gradient range; and
assign the subsection a different elevation change for determining an aggregate ascent or descent total for the expected vehicle journey if the calculated gradient falls outside a threshold range.

2. A system according to claim 1, wherein the predictor mechanism is configured to predict a vehicle energy requirement for the journey by:
determining multiple factors for the journey, each factor derived from the journey data and /or vehicle data;
applying a weighting to each factor; and
applying the weighted factors in the energy prediction algorithm to derive the predicted vehicle energy requirement for the journey.

3. A system according to claim 1, wherein for each historical journey the updater is arranged to derive a predicted energy usage using the energy prediction algorithm by:
retrieving and/or determining values for multiple factors for the historical journey, the factors being derived from journey data associated with the historical journey and/or vehicle data associated with the historical journey;
applying a weighting to each factor;
applying the weighted factors in the energy prediction algorithm to derive the predicted vehicle energy requirement for the historical journey; and
in which the updater is further arranged to apply an adjustment to a weighting for one of the factors to reduce the aggregate error, the adjustment being applied to the corresponding factor for each of the historical journeys.

4. A system according to claim 3, wherein the system is arranged to store in a memory store processed journey data and/or processed vehicle data; derived from the journey data and/or vehicle data; and factors used by the predictor mechanism to predict a vehicle energy requirement for the journey.

5. A system according to claim 1, adapted to retrieve energy-on-board data from the vehicle.

6. A system according to claim 5, wherein the system is adapted to use the energy-on-board data to determine the actual vehicle energy usage for the historical journey undertaken by the vehicle.

7. A system according to claim 5, wherein the system is adapted to use the energy-on-board data and a prediction of the vehicle energy required for the journey from the predictor mechanism to provide an output indicative of whether the journey can be made by the vehicle with the current energy on board the vehicle.

8. A system according to claim 5, comprising a vehicle device arranged to be carried by the vehicle, the vehicle device arranged to receive energy on board data and vehicle data from the vehicle and transmit the received energy-on-board data and/or vehicle data to a predictor system that comprises the predictor mechanism and updater mechanism.

9. A system according to claim 1, wherein the predictor mechanism is adapted to include a safety margin within the predicted vehicle energy requirement for the journey, and in which the updater acts to adjust the size of the safety margin according to the sizes of the individual errors of the historical journeys.

10. A computer implemented dispatch system according to claim 1, configured for selecting a vehicle from a plurality of vehicles to undertake a vehicle journey in response to receiving a journey request from a user of the system, the dispatch system comprising:
the journey request device including a network interface device communicatively coupled with the one or more communication networks, the journey request device thereby being communicatively coupled with a system, for determining a prediction of an energy requirement of a vehicle for an expected vehicle journey, carried by each vehicle of the plurality of vehicles;
a communication interface device configured to receive the journey request from the user;
the journey request device configured, in response to receiving the journey request, to transmit a plurality of requests to a plurality of systems respectively carried by the plurality of vehicles, and to receive a plurality of vehicle energy requirements from the respective plurality of vehicles, to determine for each of the plurality of vehicles, a vehicle energy requirement for the each vehicle to undertake the expected vehicle journey subject of the journey request;
a vehicle selector that uses the determined vehicle energy requirements to select a vehicle from the plurality of vehicles to undertake the expected vehicle journey; and the journey request device configured to send a journey instruction comprising information relating the expected vehicle journey subject of the journey request, to the selected vehicle.

11. A dispatch system according to claim 10, wherein the journey instruction is received by a dispatch terminal of the selected vehicle and that the dispatch terminal in response to receiving the journey instruction displays information relating to the expected vehicle journey subject of the journey request on a display within the vehicle.

12. A dispatch system according to claim 10, wherein the selected vehicle is an autonomous vehicle that comprises a vehicle controller that drives the autonomous vehicle, and in response to receiving the journey instruction is used by the controller to drive the vehicle away from its present location to undertake the expected vehicle journey.

* * * * *